(12) United States Patent
Ezumi et al.

(10) Patent No.: US 6,354,483 B1
(45) Date of Patent: Mar. 12, 2002

(54) FRICTION STIR WELDING METHOD

(75) Inventors: Masakuni Ezumi; Kazushige Fukuyori; Tetsuya Matsunaga, all of Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/644,050

(22) Filed: Aug. 23, 2000

(30) Foreign Application Priority Data

Feb. 25, 2000 (JP) ........................................ 2000-049099

(51) Int. Cl.⁷ .............................................. B23K 20/12
(52) U.S. Cl. ................................. 228/112.1; 228/114.5
(58) Field of Search ........................... 228/112.1, 114.5, 228/114, 119, 2.1

(56) References Cited

U.S. PATENT DOCUMENTS 6,237,829 B1 * 5/2001 Aota et al.
6,250,037 B1 * 6/2001 Ezumi et al.
6,276,591 B1 * 8/2001 Kaawasaki et al.

FOREIGN PATENT DOCUMENTS

JP        9-221024        8/1997

* cited by examiner

Primary Examiner—Tom Dunn
Assistant Examiner—Jonathan Johnson
(74) Attorney, Agent, or Firm—Antonelli, Terry, Stout & Kraus, LLP

(57) ABSTRACT

The abutted face plates of frame members are joined using friction stir welding. Next, a connection member is mounted on seats formed in the frame members, while a projection of one end of the connection member is inserted into a groove of an end portion of a face plate of the frame member. Next, the other end of the connection member is temporarily welded to the face plate of the hollow frame member. With this condition, an abutted portion of the face plate and the connection member are joined using friction stir welding. Then, the overlapped portion between the other end of the connection member and the frame member is joined by friction stir welding. When the hollow frame members are welded from one side, a temporary welding of the connection member can be reduced.

8 Claims, 4 Drawing Sheets

US 6,354,483 B1

FRICTION STIR WELDING METHOD

BACKGROUND OF THE INVENTION

The present invention relates to a friction stir welding method and a structural body which is formed using a friction stir welding method. For example, the present invention is directed to a friction stir welding method and a structural body made of an aluminum alloy extruded as a frame member, such as is used in a railway vehicle or a building structure and the like, formed by friction stir welding.

Friction stir welding is a method in which, by rotating a round rod (called "a rotary tool") which has been inserted into a welding joint between extruded frame members and moving the rotary tool along a welding line of the welding joint, the welding portion is heated, softened and plastically fluidized and is solidly welded. The rotary tool is comprised of a small diameter portion which is inserted into the welding joint and a large diameter portion which is positioned outside of the small diameter portion of the rotary tool. The small diameter portion and the large diameter portion of the rotary tool have the same axis. A boundary between the small diameter portion and the large diameter portion of the rotary tool is inserted to a small extent into the welding joint during welding.

The above-stated technique is disclosed, for example in Japanese application patent laid-open publication No. Hei 9-309164 (EP 0797043 A2). In FIG. 9 of this document, it can be seen that a welding of two abutting faces of two hollow extruded frame members is carried out from the opposite side of the hollow extruded frame members. Namely, the plates forming one side face of the two frame members are abutted, and from the other side of the extruded frame members, a friction stir welding is carried out. In this way, the outer face formed by said plates is welded so as to produce a flat surface.

As also shown in FIG. 9 of the above-stated document (Japanese application patent laid-open publication No. Hei 9-309164 (EP 0797043 A2)), in a case where a hollow frame member is welded from an opposite side using friction stir welding, it is necessary to strongly fix or secure a joint member 60. For this reason, the joint member 60 is fixed temporarily to the hollow frame members 31 and 32 by arc welding. Since the plate thickness of the joint member 60 is thin, the joint member 60 is subject to strain in a thickness direction by the welding heat. For this reason, there is a problem concerning the accuracy of the form of the structural body resulting from a twisting of the joint member during welding.

SUMMARY OF THE INVENTION

An object of the present invention is to provide a friction stir welding method wherein a temporary welding of a connection member to be friction stir welded becomes unnecessary.

The above-stated object can be attained in a case where one face plate of a frame member is welded using a connection member, by using a technique in which a projection at one end of the connection member is inserted into a groove in the frame member so that a proper positioning of connection member is achieved.

The above-stated object can be attained by a friction stir welding method, characterized in that, in preparing a first frame member and a second frame member for welding, wherein the first frame member and the second frame member each have a first face plate and a second face plate disposed in parallel to the first face plate, and the first and second frame members are abutted with the ends of the second face plates in contact with each other and with a third plate for connecting the first face plate and the second face plate, the welding method comprises welding the second face plates together from a side of the first face plates through a gap therein, arranging respective end portions of a connection member between an end portion of the first face plate of the first frame member and the first face plate of the second frame member across said gap by inserting one end of the connection member into a groove which opens toward the second frame member in an end portion of the first face plate of the first frame member, temporarily fixing the other end of the connection member to an end portion of the first face plate of the second frame member, and carrying out a friction stir welding on the end portion of the first face plate of the first frame member and the one end of the connection member followed by friction stir welding of the end portion of the first face plate of the second frame member and the other end of the connection member.

The above-stated object can be attained by a friction stir welded frame member that comprises a first face plate, a second face plate disposed in parallel to the first face plate and a third plate for connecting the first face plate and the second face plate, wherein at an end portion of the first face plate, a groove is provided which opens toward the end portion in a longitudinal direction of the frame member.

DESCRIPTION OF THE INVENTION

Figure 1:
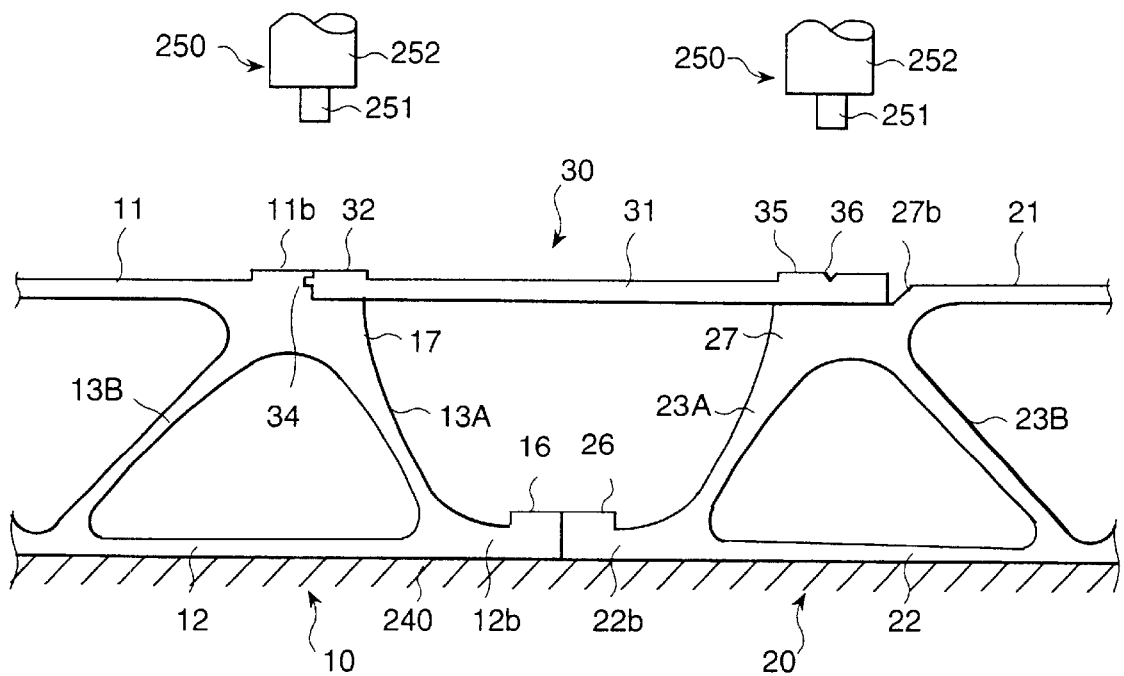
FIG. 1 is a longitudinal cross-sectional view showing a welding portion, prior to the welding, of extended frame members using a friction stir welding method according to the present invention.

One embodiment of a friction stir welding method according to the present invention will be explained with reference to FIG. 1 to FIG. 5. FIG. 1 is an enlarged view showing an essential portion of FIG. 4. FIG. 4 is a longitudinal diagrammatic view of a side structure of the card body shown in FIG. 5.

Figure 5:
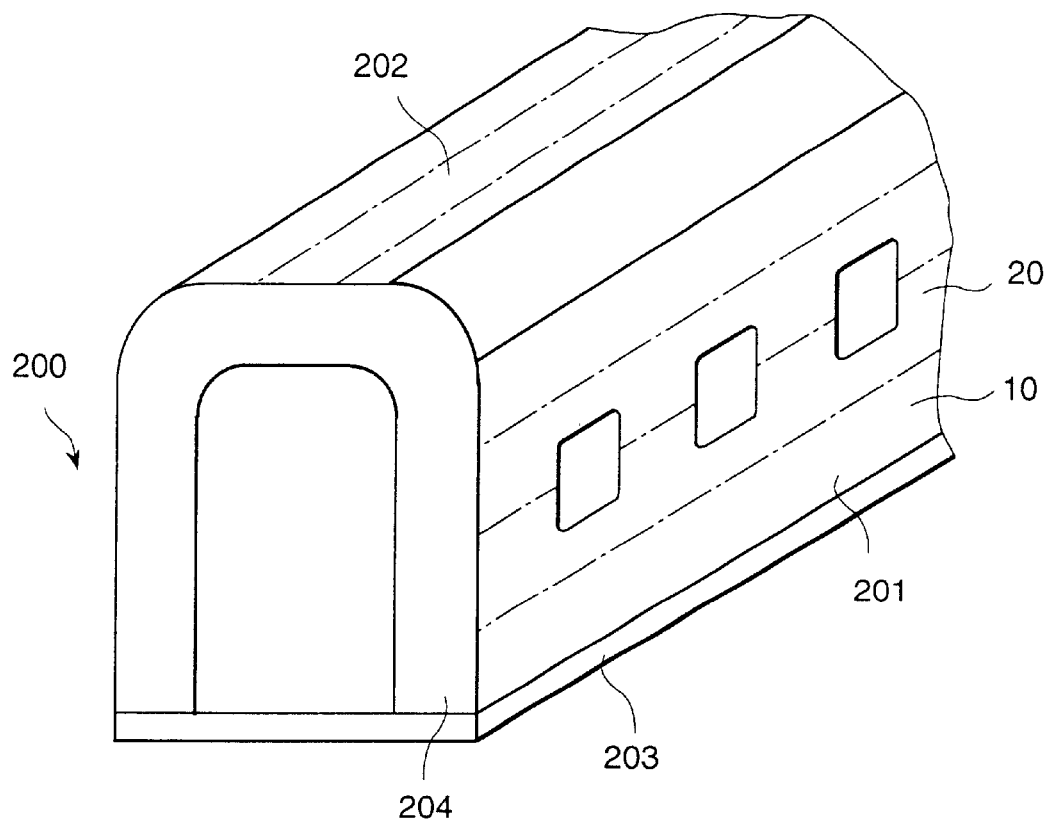
FIG. 5 is a perspective view showing a car body of a railway vehicle which has been fabricated using the friction stir welding method according to the present invention.

As seen in FIG. 5, the car body 200 is comprised of a side structure 201 for constituting a side face, a roof structure 202 for constituting a roof, a stand frame 203 for constituting a floor, and a rear structure 204 for constituting an end portion of the car. Each of the side structure 201, the roof structure 202, and the stand frame 203 is constituted respectively by joining plural extruded frame members by welding. The longitudinal direction of the extruded frame member extends in the longitudinal direction of the car body. The extruded frame member is a hollow frame member made of an aluminum alloy.

The constitution of the structural members and method of welding the hollow extruded frame members 10 and 20 for constituting the side structure 201 will be explained. Other portions and other structure are similar, and so their description will not be repeated.

The hollow frame members 10 and 20 are comprised of two sheet face plates 11, 12 and 21, 22, respectively, and a truss structure formed therewith by plural ribs 13 and 23. The two sheet face plates 11 and 12 are disposed substantially in parallel. The two sheet face plates 21 and 22 are disposed substantially in parallel. The pitch of the truss structure formed by the ribs 13 and 23 is the same. The buss structure is constituted by the rites 13 and 23, and a center line in the plate thickness direction of the respective face plates 11 and 12 and the respective face plates 21 and 22 passes through an apex of each truss formed at a side of the face plates 11 and 12 and the face plates 21 and 22.

In the vicinity of the apex of the truss structure on an inner side of the railway car, rails 19 and 29 for installing machines and apparatuses are provided integrally. The rails 19 and 29 are each comprised of two L-shaped members. The rails 19 and 29 become scats for installing the machines and apparatuses, such as interior mounting plates and chairs and the like.

End portions of the face plates 12 and 22, which are positioned on an outer face side of the car body, project toward the adjacent hollow frame members 20 and 10 from the end portions of the face plates 11 and 21 on the inner side of the car. These projected face plates are indicated as 12b and 22b. After abutting the end portions of the face plates 12b and 22b together, friction stir welding is carried out. This friction stir welding is carried out to join the gap at the abutted portion. The plate thickness of each of the face plates 12b and 22b is thicker than other portion of the face plates 12 and 22 to provide the additional metal to fill in the welding gap during welding.

Figure 2:
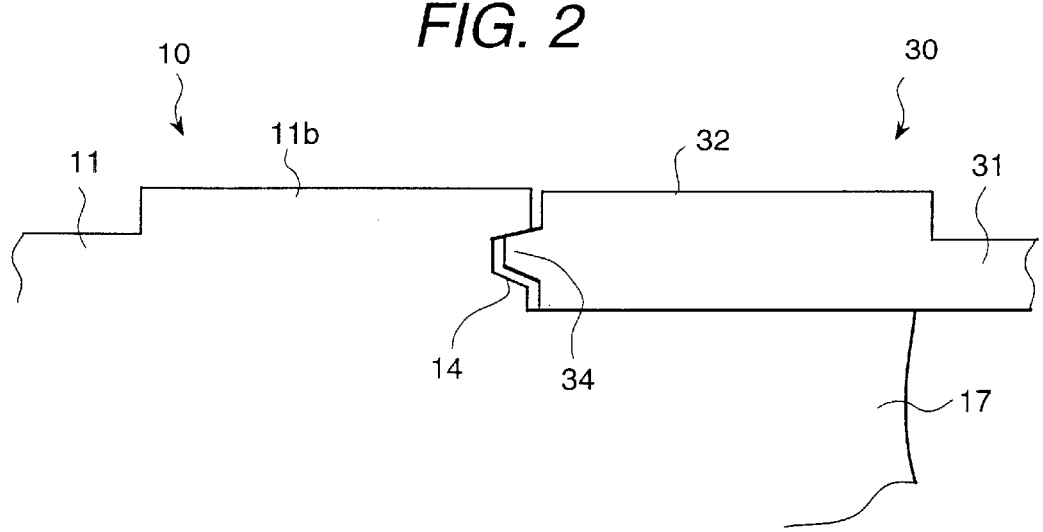
FIG. 2 is a longitudinal cross-sectional view showing an essential portion of FIG. 1.

The hollow frame members 10 and 20 are mounted on a bed 240 with the face plates 12 and 22 facing down on the bed 240 and the face plates 11 and 21 facing up, as seen in FIG. 2. By inserting a rotary tool 250 into the welding joint between the ends 12b, 22b from above, friction stir welding is carried out. The friction stir welding is carried out from the inner side of the car.

At the end portions (the abutted portions) of the face plates 12b and 22b, raised portions 16 and 26, which project toward the inner side of the car (namely, toward the face plates 11 and 21), are provided. The width and height of each of the raised portions 16 and 26 are substantially the same.

Between the end portion of the face plate 11, at the car inner side, and the end portion of the face plate 21 a connection member 30 is positioned and welded in place. The end portions of the connection member 30 are mounted (overlapped) on the seats 17 and 27, respectively, which are each provided on the apex of a respective truss structure. The seats 17 and 27 are recessed from the outer face (upper face) of the face plates 11 and 12.

The seat 17 is formed at the end portion of the hollow frame member 10 in an area where a normal line passes through an intersection between the rib 13A and the rib 13B. A face extending from the seat 17 to the outer face (the upper face) of the face plate 11 is formed on the above-stated normal line. At that end portion of the face plate 11, at the seat 17 side, there is a raised portion 11b, which projects outward from the outer face (the upper face).

At one end portion of the connection member 30, there is a raised portion 32 which projects outward from the outer face (the upper face) of the connection member 30. The width and height of the raised portions 11b and 32 are the same as those of the raised portions 16 and 26. The width of the seat 17 is the same to the width of the raised portion 32.

In a vertical face at the end of the face plate 11 of the hollow frame member 10, there is a groove 14, which opens toward the end portion of the face plate 21 of the other hollow frame member 20. The groove 14 extends continuously in a longitudinal direction of the hollow frame member 10. The groove 14 has a trapezoidal form. The large side of the trapezoidal groove 14 faces outwardly.

Into the groove 14, there is inserted a trapezoidal projection 34, which extends from the end portion of the connection member 30. As to the sizes of the two trapezoidal forms, the size of the groove 14 is larger than the size of the projection 34, so that when the projection is inserted fully into the groove 14, a vertical face of the end portion of the face plate 11 and a vertical face of the end portion of the connection member 30 are in contact and extend along a normal line which passes through the intersecting point of the truss structure. For this reason, the axial center of the rotary tool 250 is positioned to coincide with the vertical face at the engaged ends during welding. The depth of the groove 14 is less than a half of the diameter of the small diameter portion 251 of the rotary tool 250. When the projection portion 34 is inserted into the groove 14, a lower face of the connection member 30 comes into contact with an upper face of the seat 17, and a face on an upper side of the projection portion 34 is designed to contact a face of an upper side of the groove 14, as seen in FIG. 2.

The height of the projection portion 34 is less than the thickness of the end portion of the connection member 30. The groove 14 and the projection 34 are positioned in a range of the plate thickness including the raised portions 11b and 32. The upper ends of the groove 14 and the projection 34 are arranged to extend above (the apex sides of the raised portions 11b and 32) the upper face of the face plate 11 and an extension line of the upper face of except for the raised portion 32, of the connection member 30. Since the raised portions 11b and 32 are provided, even though the face plate 11 and the connection member 30 are thin, it is possible to provide the groove 14 having a desired height.

The seat 27 is arranged at an intersecting point between the rib 23A and the rib 23B as a center. At a center of the width of the seat 27, the above-stated intersecting point is arranged. Namely, the apex of the truss structure of the end portion is arranged at the central portion of the width of the seat 27. The face extending from the seat 27 to the face plate 21 is inclined as the groove 14 for effecting arc welding to the connection member 30. A raised portion 35 is arranged at the end portion of the connection member 30, which is mounted on the seat 27. The height of the raised portion 35 is similar to that of the raised portions 16, 26, 11b and 32. The width of the raised portion 35 is similar to the sum of the widths of the raised portions 16 and 26.

The connection member 30 is arranged to extend the surfaces of the plate plates 11 and 21 to form a continuous surface. The central portion, except for the end portions of the connection member 30, is formed by a plate 31, and the plate thickness of the plate 31 is substantially the same as the plate thickness of the face plates 11 and 21. In the upper face of the raised portion 35, a V-shape groove 36 is provided. The groove 36 is arranged at the center of the width of the raised portion 35.

The width of the raised portion 35 is larger then the diameter of the large diameter portion 252 of the rotary tool 250. The groove 36 is used for position detecting to guide the rotary tool 250. For this purpose, the groove 36 is detected by a laser sensor and the axial center of the rotary tool 250 is positioned to coincide with the groove 36. An extension line of the groove 36, namely on the axial center of the rotary tool 250, passes through an intersecting point of the two ribs 23A and 23B.

The width of the connection member 30 is smaller than the interval between the face plates 11 and 21 of the two hollow frame members 10 and 20. The connection member 30 is an extruded frame member made of the same material of the hollow frame members 10 and 20. The length of the connection member 30 is, for example, 1 m. Thus, plural connection members 30 are arranged in the length direction of the hollow frame members 10 and 20. The space between the connection members 30 is arranged as small as possible, so as to produce the effect of one continuous connection member 30. Since the connection member 30 has no rib, the connection member 30 can bend easily in the plate thickness direction, and the transportation thereof and the like may be difficult.

A distance P from the end of the face plate 11 to the end of the face plate 21 (the distance from the apex of the truss structure at the end of the hollow frame member 10 and the apex of the truss structure at the end of the hollow frame member 20) is the same pitch P of the truss structure at the other positions. Each of the truss structures of the hollow frame members 10 and 20 is an isosceles triangle, except for the truss structure at the end of the hollow frame members 10 and 20, which is not an isosceles triangle. In this regard, the rib 13A is connected to a point midway between the end of the face plate 12 and a point of intersection of a normal line with the face plate 12, while the rib 23A is connected to a point midway between the end of the face plate 22 and a point of intersection of a normal line with the face plate 22. Between the rib 13A and the rib 23A, a space for inserting the friction stir welding apparatus from the side of the face plates 11, 21 is formed.

The method of manufacturing this structural body will be explained. The hollow frame members 10 and 20 are mounted on the bed 240. Next, the face plates 12 and 22 are moved until the ends 12b and 22b are abutted. Next, these hollow frame members 10 and 20 are fixed on the bed 240. Next, the end faces of the ends 12b and 22b are fixed temporarily by arc welding. This temporary welding is carried out intermittently at spaced positions along the joint between the abutting ends 12b, 22b.

The upper face of the bed 240 on which the abutted end portions 12b and 22b are mounted is flat. Three portions which are the vicinity of the abutted portions 12b and 22b, an area in the vicinity of the intersecting point between the face plate 12 and the ribs 13A and 23A, the end portions 12b and 22b, and an area in the vicinity of the intersecting point between the face plate 22 and the ribs 13B and 23B are mounted on the bed 240 so as to have the same height.

With this condition, the rotary tool 250 of the friction stir welding apparatus is inserted from above into joint between the abutted raised portions 16 and 26 and is moved along a welding line, so that friction stir welding is carried out. The axial center of the rotary tool 250 is aligned in a perpendicular direction (the direction along to the normal line of the welding portion). However, relative to the advancing direction of the rotary tool 250, the axial center is inclined, as is already known.

The rotary tool 250 comprises the large diameter portion 252 and the small diameter portion 251 at a tip end of the large diameter portion 252. The tip end (the lower end) of the small diameter portion 251 of the rotary tool 250 is inserted all the way to the lower face from an upper face of the end portions 12b and 22b.

The lower end of the large diameter portion 252 of the rotary tool 250 is inserted to a point between the apex of the raised portions 16 and 26 and the level of the inner faces of the face plates 12 and 22 (the side facing the plates 11 and 21). The diameter of the large diameter portion 252 of the rotary tool 250 is smaller than the combined width of the two raised portions 16 and 26. The small diameter portion 251 of the rotary tool 250 forms a screw member.

During the friction stir welding, the apexes of the raised portions 16 and 26 are pressed down against the bed 240 by a roller which moves together with the rotary tool 250.

The raised portions 16 and 26 are detected by a laser sensor. According to this, a height position of the raised portions 16 and 26 is detected, and the required insertion amount of the rotary tool 250 is determined. Further, a gap is formed by the abutted surfaces of the two raised portions 16 and 26, and the axial center of the rotary tool 250 is guided to this position.

According to this friction stir welding, the gap formed by the abutted end portions 12b and 22b is buried and welded. The original material of the metal for burying the gap is derived from the raised portions 16 and 26. The outer face (the outer side of the car) of the face plates 12 and 22 is welded flatly. At the outer face of the face plates 12 and 22, there is no recessed portion on the welding line.

Figure 3:
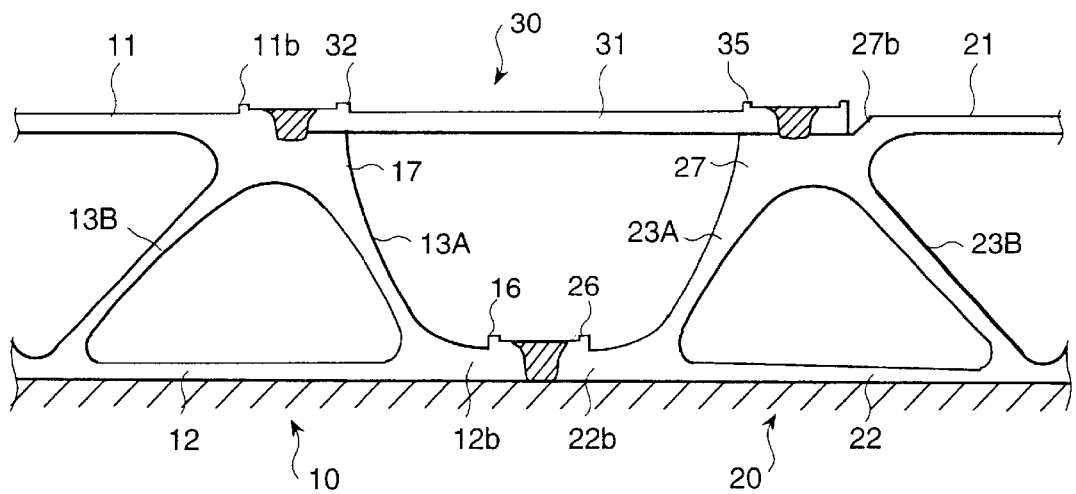
FIG. 3 is a longitudinal cross-sectional view showing the welding portion subsequent to the welding of the frame member using the friction stir welding method according to the present invention.
Figure 4:
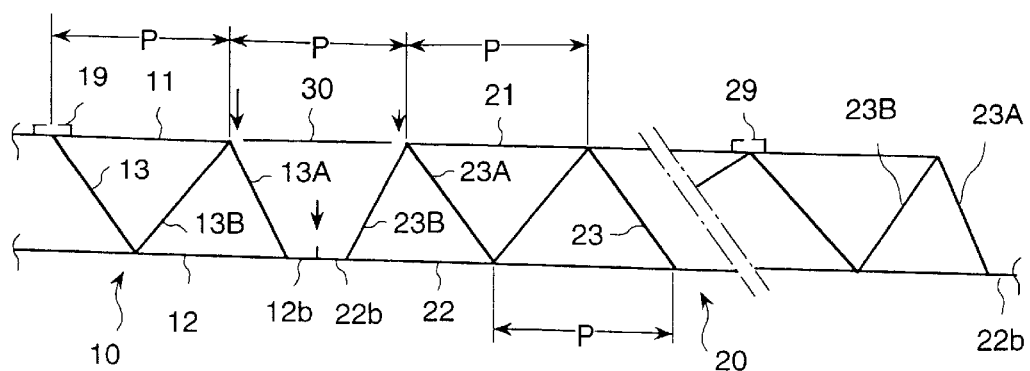
FIG. 4 is a longitudinal diagrammatic view showing a hollow frame member to be formed by the friction stir welding method according to the present invention.

The upper face of the raised portions 16 and 26 takes on a convex form as a result of the large diameter portion 252 of the rotary tool 250, as seen in FIG. 3. At the both ends of the recessed portion, parts of the raised portions 16 and 26 are left.

Next, the connection member 30 is mounted with its ends resting on the seats 17 and 27 of the face plates 11 and 21. A vertical face of the connection member 30 (except for the projection 34) is abutted against a vertical face (except for the groove 14) of an end portion of the face plate 11. It is desirable to form as small an interval between the vertical faces of the hollow frame members 10 and 20 as possible. It is also desirable to form as small an interval as possible between the end portion of the connection member 30 in the longitudinal direction and the end portions of the hollow frame members 10 and 20.

The insertion of the projection 34 into the groove 14 can be arranged by inserting it from one side in the longitudinal direction of the hollow frame members 10 and 20. Or, the distance from the vertical face of the face plate 11 to an inclined face 27b is provided so as to be larger than the width of the connection member 30, so that after the connection member 30 is mounted on the seats 17 and 27, the connection member 30 is moved toward the face plate 11 as the end thereof contacts the inclined face 27b, whereby the projection 34 is inserted into the groove 14. Or, from the diagonal upper portion, the projection portion 34 is inserted into the groove 34.

For example, as one end of the connection member 30 is mounted on the seat 17 and the other end comes into contact with the inclined face 27b, the connection member 30 is moved toward the face plate 11 to cause the projection 34 to engage in the groove 14. The positions, the shapes and the sizes of the groove 14 and the projection 34 are established to make it possible to engage them from a diagonal upper direction.

Next, the end portion of the connection member 30 is fixed temporarily to the face plate 21 by arc welding. This temporary welding is carried out intermittently at spaced intervals. Since the projection 34 on the face plate 11 side of the connection member 30 is inserted into the groove 14, the connection member 30 is not able to move up and down at this end. For this reason, is unnecessary to carry out temporary welding of this portion. Thus, when the temporary welding is carried out, the number of welds can be reduced. The temporary welding is not carried out to weld the raised portion 32 to the raised portion 11b. For this reason, the thermal strain on the connection member 30 and the hollow frame member 10 can be reduced.

Next, using the same friction stir welding apparatus which was used in the friction stir welding of the abutted end portions 12b and 22b of the face plates 12 and 22, the welding of the abutted portion formed by the one end of the connection member 30 and the end portion of the face plate 11 is carried out. This is same welding as applied to the abutted portion of the raised portions 16 and 26. The small diameter portion 251 of the rotary tool 250 is inserted so as to reach the seat 17.

The space formed between the groove 14 and the projection portion 34 is buried by the material derived from the raised portions 11b and 32. For this reason, even though the groove 14 exists, the welding is carried out as the welding of an ordinary abutted portion.

Next, the welding of the seat 27 to other end of the connection member 30 is carried out. Under a condition where the rotary tool 250 is inserted from above into a portion where the connection member 30 and the seat 27 are overlapped, the rotary tool 250 is moved along the welding line and friction stir welding is carried out. The width of the raised portion 35 is larger than the diameter of the large diameter portion 252 of the rotary tool 250. At a center of the raised portion 35 a groove 36 is provided. The rotation axial center of the rotary tool 250 guided so as to is coincide with and follow the groove 36. A tip end of the small diameter portion 251 of the rotary tool 250 is inserted deeply to the seat 27.

With this construction, an overlapping welding is carried out. The lower end of the large diameter portion 252 of the rotary tool 250 is inserted to a point between the upper face of the connection member 30 forming the non-raised portion and the apex of the raised portion 35.

The upper face of the raised portion 35 takes on a convex form during welding as a result of the large diameter portion 252 of the rotary tool 250, as seen in FIG. 3. At both ends of the recessed portion, a part of the raised portion 35 is left.

The above-stated sensor of the friction stir welding apparatus detects the groove 36, and in response to such detection, the rotary tool 250 is moved along to the groove 36.

FIG. 3 shows schematically the state of the welding 17 portion after the welding. A hatched portion shows the welded portion.

The axial center of the rotary tool 250 is positioned at the apex point of the truss structure of the two ribs 13A and 13B or on a perpendicular line in the vicinity thereof during welding of one end of the connection member 30. The axial center of the rotary tool 250 is positioned at the apex point of the truss structure of the two ribs 23A and 23B or on a perpendicular line in the vicinity thereof during welding at the other end of the connection member 30.

To withstand the force imposed by welding, the plate thickness of the ribs 13A and 13B has been increased, the area which connects the rite and the face plate has an arcuate shape, and the thickness of the connection member 30 and the thickness of the seats 17 and 27 have been increased. For the same reason, the plate thickness of the ribs 23A and 23B has been increased, the area which connects the rib and the face plate has an arcuate shape, and the thickness of the connection member 30 and the thickness of the seats 17 and 27 have been increased.

According to the above, one of the joints (the joint of the raised portions 11b and 32) can be the abut joint, which provides an improvement of the joint efficiency and reduction of the stress concentration in the bent portion, whereby the strength of the joint can be improved.

Further, since the temporary fixing of the one end of the connection member 30 by arc welding is unnecessary or can be minimized, the thermal strain on the structural body can reduced and the outer appearance can be improved, so that the installation of the interior mounting members can be carried 18 out easily.

The welding of both faces of the hollow frame members 10 and 20 is carried out from one side thereof. For this reason, it is unnecessary to reverse the structural body to effect the welding. Accordingly, the structure can be manufactured at a low cost and with a high accuracy.

Further, the outer face of the welding portion of the face plates 12b and 22b can be welded so as to produce a flat outer surface. The raised portions 16, 26 and 35 are arranged so as to be directed toward the inside of the structural body and the inside of the car body rather than toward the outside (the outer face side, the car outer side) on which a flat face is required. Further, at the car outer side, there is no recessed portion created by deleting material produced by the rotary tool 250. For this reason, machining to cut-off the raised portions 16, 26 and 35 is unnecessary, and so the car body can be manufactured with a low cost. Further, the bed 240 can be replaced by a backing member, such as a roller and the like.

The abutted portion is welded at first, and next the overlapped portion is welded. For this reason, in comparison with the case wherein the overlapped portion is welded at first and next the abutted portion is welded, a good friction stir welding can be carried out.

It is considered that the strength of the weld (the weld between the seat 27 and the connection member 30) at the overlapping portion and the strength of the bending portion of the face plate 21 may be inferior to the strength of the weld of the abutted portion (the weld between the face plate 11 and the connection member 30). In this case, the end portion of the connection member 30 and the end portion of the face plate 21 are welded using arc welding. This arc welding can be carried at the portions where more strength is necessary, for example, at the position which is near to the corner portion of the opening.

Further, the body welded in the above stated manner can be used as an outer face (face to be seen) of the structural body, such as a building structure and the like.

The portion for mounting the connection member 30 can be set at the location in the structure which can bear the load created during the friction stir welding. For example, the location can be set as shown in FIG. 9 of the above-stated document (Japanese application patent laid-open publication No. Hei 9-309164 (EP 0797043 A2)).

The welding between the hollow frame member 10 and the connection member 30 is carried out at the abutting portion, however this portion can be welded using overlapping welding. The seat 17 can be formed similarly to the seat 27. At one end of the connection member 30, the raised portion 35 having the groove 36 is provided. At the other end of the connection member 30, at the hollow frame member 10 side, the projection 34 is provided. The end portion having the raised portion 35 is welded using overlapping welding. The position of the welding is located at the apex of the truss structure (the position of the groove 36).

Figure 6A:
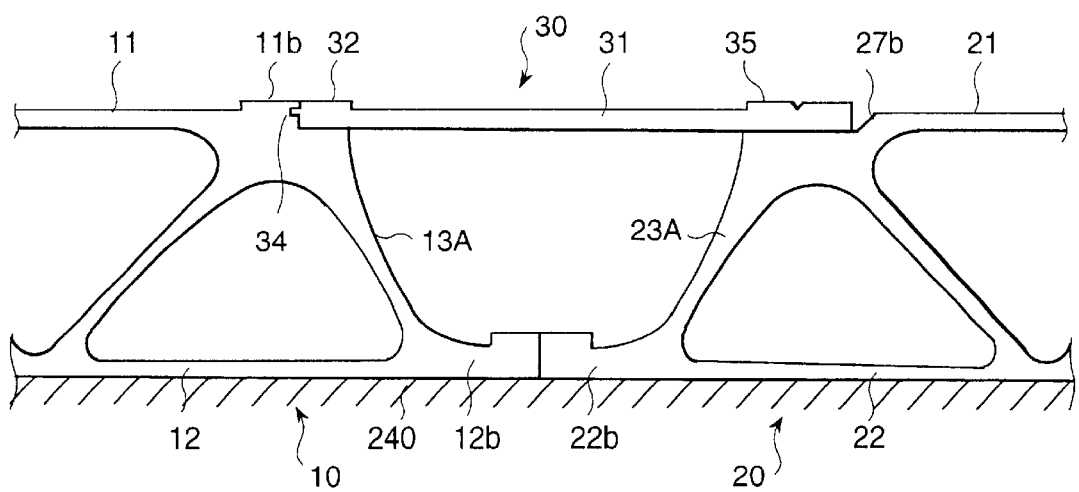
FIG. 6A is a longitudinal cross-sectional view of a welding portion of a structural body to be formed by the friction stir welding method according to the present invention.
Figure 6B:
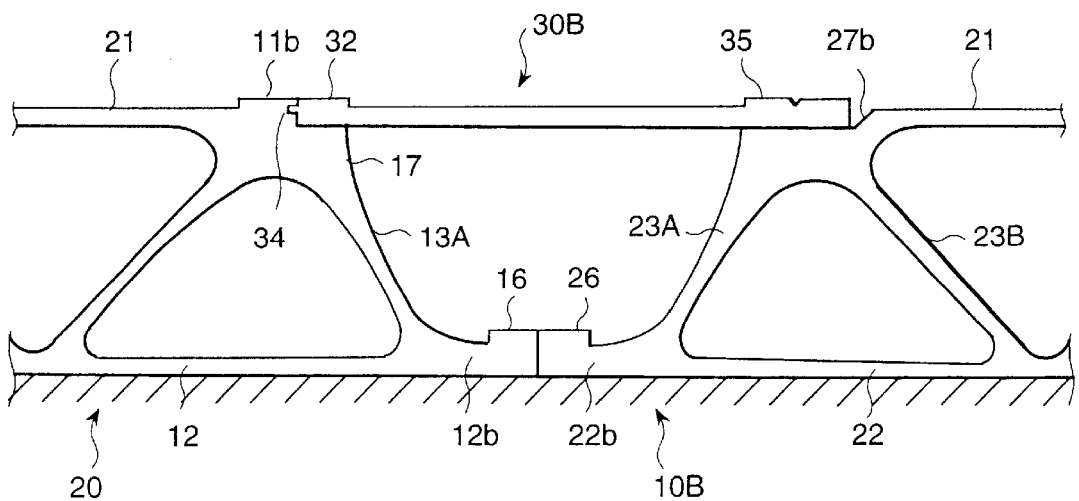
FIG. 6B is a longitudinal cross-sectional view of a welding portion of a structural body to be formed by the friction stir welding method according to the present invention.

An embodiment illustrated in FIG. 6A and FIG. 6B will be explained. This is suited for the manufacture of a large structural body by welding more then three hollow frame members. An example is the side structure body 201 of a railway car, as seen in FIG. 5. The relationship between the right side hollow frame members 10 and 20 and the connection member 30 as seen in FIG. 6A is similar to that of the embodiment of FIG. 1. At the other end (the right end) of the central hollow frame member 20, a hollow frame member 10B and a connection member 30B are welded. The left end of the hollow frame member 10B and the connection member 30B are the same as the left end of the hollow frame member 20 and the connection member 30.

The structure of the other end (the right end) of the hollow frame member 20 is the same as the structure of the right end of the hollow frame member 10. The structure of the left end of the hollow frame member 10B, which is welded to the end of the hollow frame member 20, is the same as the structure of the left end of the hollow frame member 20. The structure of the connection member 30B is the same as that of the connection member 30.

The left end of the hollow frame member 20 and the right end of the hollow frame member 10 are shown in FIG. 6A. The right end of the hollow frame member 20 and the left end of the hollow frame member 10B are shown in FIG. 6B.

Namely, three hollow frame members are welded together. At one end (the left end) of the face plate 21 of the central hollow frame member 20, a slope face 27b is provided, while at the other end (the right end) of the face plate 21, the raised portion 11b and the groove 14 are provided. With this structure, the direction of the raised portion 32 of the connection members 30 and 30B on both sides of the central hollow frame member 20 and the direction of the projection 34 are the same, so that a mistake in the arrangement of the connection member 30 can be avoided.

As to the welding procedure, the three hollow frame members are mounted on the bed 240 and restrained. Thereafter, the procedure is similar to the case of FIG. 1.

Figure 7:
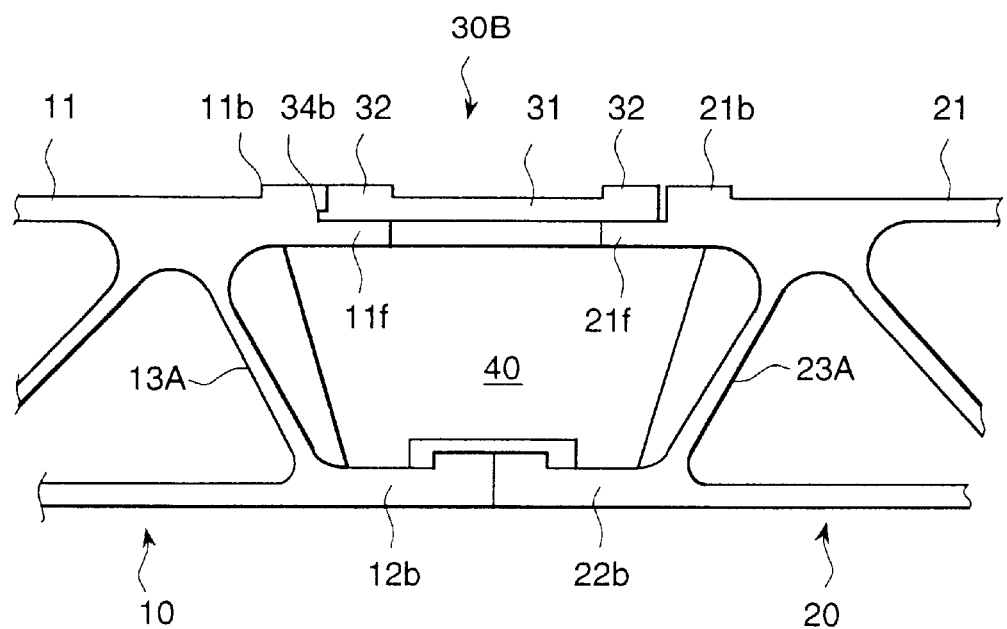
FIG. 7 is a longitudinal cross-sectional view of a welding portion of a structural body to be formed by the friction stir welding method according to the present invention.

An embodiment illustrated in FIG. 7 will be explained. In a space formed by the face plates 12b and 22b, the ribs 13A and 23A, and the connection member 30, a supporting stand 40 is arranged. The supporting stand 40 is mounted on the face plates 12b and 22b. The end portion of the connection member 30 is mounted on projection chips 11f and 21f extending from the end portions of the face plates 11 and 21. The lower surfaces of the abutted portion, including the projection chips 11f and 21f, are supported on the supporting stand 40. Both ends of the connection member 30, a raised portion 32 is provided. Both ends are abutted and welded. At one end, the projection 34b is provided.

The abutted portion of the face plates 11 and 21 and the connection member 30 is welded using friction stir welding. When the abutted portion between the face plate 21 and the connection member 30 is welded, the face plate 21 and the connection member 30 are joined with a high accuracy.

After the friction stir welding, the supporting stand 40 is pulled out in the longitudinal direction.

Although the present invention has been described and illustrated with respect to various exemplary embodiments thereof, it should be understood by those skilled in the art the various changes, omissions and additions may be made therein and thereto, without departing from the spirit and scope of the present invention. Thus, the present invention should be construed to include all possible embodiments and equivalents thereof which fall within the scope of the appended claims.

According to the present invention, since the arc welding of the connection member can be reduced, a structural body having a high accuracy can be provided.

What is claimed is:

1. A friction stir welding method for use in welding a first frame member and a second frame member, wherein said first frame member and said second frame member are abutted and each have a first face plate, a second face plate disposed in parallel to said first face plate and a third plate for connecting said first face plate and said second face plate, said welding method comprising the steps of:

welding said second face plates together from a side of said first face plate;

arranging a respective end portions of a connection member between an end portion of the first face plate of the first frame member and said first face plate of said second frame member, including inserting one end of said connection member into a groove which opens toward said second frame member in an end portion of said first face plate of said first frame member;

temporarily fixing the other end of said connection member to an end portion of said first face plate of said second frame member; and carrying out a friction stir welding on said end portion of said first face plate of said first frame member and one end of said connection member and carrying out a friction stir welding on an end portion of said first face plate of said second frame member and the other end of said connection member.

2. A friction stir welding method according to claim 1, characterized in that the friction stir welding is carried out on an abutted portion between said end portion of said first face plate of said first frame member and said one end portion of said connection member after carrying out friction stir welding on an abutted portion between said end portion of said first face plate of said second frame member and said other end of said connection member.

3. A friction stir welding method according to claim 1, characterized in that said friction stir welding is carried out by a rotary tool having a small diameter portion which is more than two times the length of said groove.

4. A friction stir welding method for use in welding a first frame member and a second frame member, wherein said first frame member and said second frame member are abutted and each have a first face plate, a second face plate disposed in parallel to said first face plate and a third plate for connecting said first face plate and said second face plate, the first face plate of said first frame member and the first face plate of said second frame member each having a recessed portion formed of an end portion of said first face plate where it meets said third plate, said recessed portion opening toward an outer side in a thickness direction of said first and second frame members, said welding method comprising the steps of:

welding said second face plates together with from a side of said first face plates though said recessed plate;

mounting respective end portions of a connection member said recessed portion of said first frame member and said recessed portion of said second frame member, respectively, inserting one end of said connection member into a groove which opens toward said second frame member in an end portion of said first face plate of said first frame member;

temporarily fixing the other end of said connection member to an end portion of said first face plate of said second frame member; and carrying out a friction stir welding on said end portion of said first face plate of said first frame member and one end of said connection member and carrying out a friction stir welding on an end portion of said first face plate of said second frame member and another end of said connection member.

5. A friction stir welding method according to claim 4, characterized in that the friction stir welding is carried out on an abutted portion between said end portion of said first face plate of said first frame member and said one end portion of said connection member after carrying out friction stir welding on an abutted portion between said end portion of said first face plate of said second frame member and said other end of said connection member.

6. A friction stir welding method according to claim 5, characterized in that the friction stir welding is carried out on said abutted portion including said groove.

7. A friction stir welding method according to claim 4, characterized in that the friction stir welding is carried out on an overlapped portion between one end of said connection member and said recessed portion of said first frame member.

8. A friction stir welding method for use in welding a first frame member and a second frame member, wherein said first frame member and said second frame member are abutted and each have a first face plate, a second face plate disposed in parallel to said first face plate and a third plate for connecting said first face plate and said second face plate, said welding method comprising the steps of:

welding said second face plates together with from a side of said first face plate;

arranging respective end portions of a connection member between an end portion of the first face plate of said first frame member and the first face plate of said second frame member, including arranging plural connection members in a longitudinal direction of said frame members; and carrying out a friction stir welding of said end portion of said first face plate of said first frame member and one end of said connection member and carrying out a friction stir welding of an end portion of said first face plate of said second frame member and another end of said connection member.

* * * * *